(12) United States Patent
Du et al.

(10) Patent No.: US 12,342,205 B2
(45) Date of Patent: Jun. 24, 2025

(54) METHOD, DEVICE AND COMPUTER READABLE MEDIUM OF COMMUNICATION

(71) Applicant: Nokia Technologies Oy, Espoo (FI)

(72) Inventors: Lei Du, Beijing (CN); Lars Dalsgaard, Oulu (FI)

(73) Assignee: Nokia Technologies Oy, Espoo (FI)

( * ) Notice: Subject to any disclaimer, the term of this patent is extended or adjusted under 35 U.S.C. 154(b) by 383 days.

(21) Appl. No.: 17/907,337

(22) PCT Filed: Apr. 10, 2020

(86) PCT No.: PCT/CN2020/084127
§ 371 (c)(1),
(2) Date: Sep. 26, 2022

(87) PCT Pub. No.: WO2021/203401
PCT Pub. Date: Oct. 14, 2021

(65) Prior Publication Data
US 2023/0097223 A1 Mar. 30, 2023

(51) Int. Cl.
*H04W 24/10* (2009.01)
*H04L 5/00* (2006.01)

(52) U.S. Cl.
CPC .......... *H04W 24/10* (2013.01); *H04L 5/0051* (2013.01)

(58) Field of Classification Search
CPC ............ H04W 24/10; H04W 36/0058; H04W 36/0094; H04L 5/0051; H04L 5/001; H04L 5/0048; H04L 5/0053
See application file for complete search history.

(56) References Cited

U.S. PATENT DOCUMENTS 12,089,256 B2 * 9/2024 Jiang .................... H04B 7/0695
2013/0010707 A1 1/2013 Gaal et al.
(Continued)

FOREIGN PATENT DOCUMENTS

CN 109951264 A 6/2019
EP 3471332 A1 4/2019
(Continued)

OTHER PUBLICATIONS

"New WID on RRM requirements for CSI-RS based L3 measurement", 3GPP TSG RAN Meeting #84, RP-191580, Agenda: 9.1.4, CATT, Jun. 3-6, 2019, pp. 1-3.
(Continued)

*Primary Examiner* — Kabir A Timory
(74) *Attorney, Agent, or Firm* — Barta Jones, PLLC (57) ABSTRACT

Embodiments of the present disclosure relate to a method, device and computer readable storage medium of communication. The method implemented at a first device comprises receiving, from a second device, a first configuration about a first measurement of first downlink reference signals of the second device and a second configuration about a second measurement of second downlink reference signals of a third device; determining, based on an active bandwidth part of the first device and the first and second configurations, first information for the first measurement and second information for the second measurement; determining a first result of the first measurement based on the first information and a second result of the second measurement based on the second information; and transmitting the first result and the second result to the second device. As such, a fair comparison between the first and second results can be made, and thus it is helpful for the second device to make a correct mobility decision.

19 Claims, 5 Drawing Sheets

(56) References Cited

U.S. PATENT DOCUMENTS

| | | | |
|---|---|---|---|
| 2014/0192672 A1 | 7/2014 | Seo et al. | |
| 2019/0132109 A1 | 5/2019 | Zhou et al. | |
| 2019/0182000 A1 | 6/2019 | Futaki | |
| 2019/0261425 A1 | 8/2019 | Park et al. | |
| 2019/0349161 A1 | 11/2019 | Jin et al. | |
| 2020/0313831 A1* | 10/2020 | Kim | H04W 72/23 |

FOREIGN PATENT DOCUMENTS

| | | | |
|---|---|---|---|
| WO | 2011/100676 A1 | 8/2011 | |
| WO | 2016/018079 A1 | 2/2016 | |
| WO | 2019/054709 A1 | 3/2019 | |
| WO | 2019/062658 A1 | 4/2019 | |
| WO | 2019/139140 A1 | 7/2019 | |
| WO | 2019/191965 A1 | 10/2019 | |
| WO | 2019/213923 A1 | 11/2019 | |
| WO | 2019/214601 A1 | 11/2019 | |
| WO | 2020/001575 A1 | 1/2020 | |
| WO | 2020/029218 A1 | 2/2020 | |
| WO | 2020/031324 A1 | 2/2020 | |

OTHER PUBLICATIONS

"3rd Generation Partnership Project; Technical Specification Group Radio Access Network; NR; Requirements for support of radio resource management (Release 16)", 3GPP TS 38.133, V16.2.0, Dec. 2019, 1130 pages.

"3rd Generation Partnership Project; Technical Specification Group Radio Access Network; NR; Radio Resource Control (RRC) protocol specification (Release 15)", 3GPP TS 38.331, V15.9.0, Mar. 2020, pp. 1-536.

"Discussion on CSI-RS based measurement requirements for NR mobility", 3GPP TSG-RAN WG4 Meeting #93, R4-1914838, Agenda: 9.16.1.1, Huawei, Nov. 18-22, 2019, pp. 1-2.

"Discussion on CSI-RS measurement bandwidth", 3GPP TSG-RAN WG4 Meeting #93, R4-1914459, Agenda: 9.16.1.1, Nokia, Nov. 18-22, 2019, 3 pages.

"CSI-RS parameters for RRM core requirements", 3GPP TSG-RAN WG4 Meeting #93, R4-1913569, Agenda: 9.16.1.1. NTT Docomo Inc, Nov. 18-22, 2019, 3 pages.

"Simulation results for CSI-RS based measurements", 3GPP TSG-RAN WG4 Meeting #93, R4-1914462, Agenda: 9.16.1.6, Nokia, Nov. 18-22, 2019, 3 pages.

"CSI-RS based intra-f and inter-f measurement definition", 3GPP TSG-RAN WG4 Meeting#94-e, R4-200xxxx, Agenda: 6.16.1.2, Nokia, Apr. 24-30, 2020, 4 pages.

International Search Report and Written Opinion received for corresponding Patent Cooperation Treaty Application No. PCT/CN2020/084127, dated Dec. 30, 2020, 9 pages.

Office Action received for corresponding Chinese Patent Application No. 202080101549.3, dated Mar. 29, 2024, 7 pages of Office Action and no page of translation available.

Office action received for corresponding Japanese Patent Application No. 2022-561615, dated Oct. 17, 2023, 6 pages of office action and 5 pages of summary/Translation available.

Office action received for corresponding Indian Patent Application No. 202247063975, dated Jan. 13, 2023, 6 pages.

Extended European Search Report received for corresponding European Patent Application No. 20929907.2, dated Mar. 9, 2023, 10 pages.

\* cited by examiner

METHOD, DEVICE AND COMPUTER READABLE MEDIUM OF COMMUNICATION

RELATED APPLICATION

This application was originally filed as PCT Application No. PCT/CN2020/084127 on Apr. 10, 2020, each of which is incorporated herein by reference in its entirety.

FIELD

Embodiments of the present disclosure generally relate to the field of telecommunication and in particular, to a method, device and computer readable storage medium of communication in radio resource management (RRM) measurements.

BACKGROUND

Currently, a channel state information reference signal (CSI-RS) is designed for mobility management, and CSI-RS based RRM measurements play an important role in mobility decision and network optimization.

For CSI-RS based RRM measurements, a terminal device in a serving cell may be configured with a list of CSI-RS resources for each neighbor cell to be measured. The CSI-RS resource in the neighbor cell may have different bandwidth, different center frequency and/or different time-frequency location from the CSI-RS resource in the serving cell. In this case, the focus is on how to measure the CSI-RS resources in the serving and neighbor cells for facilitating mobility decision.

SUMMARY

In general, example embodiments of the present disclosure provide a solution for RRM measurements.

In a first aspect, there is provided a method. The method comprises: receiving, at a first device and from a second device, a first configuration about a first measurement of a first downlink reference signal of the second device and a second configuration about a second measurement of a second downlink reference signal of a third device; determining, based on an active bandwidth part of the first device and the first and second configurations, first information for the first measurement and second information for the second measurement; determining a first result of the first measurement based on the first information and a second result of the second measurement based on the second information; and transmitting the first result and the second result to the second device.

In a second aspect, there is provided a first device. The first device comprises: at least one processor; and at least one memory including computer program codes; the at least one memory and the computer program codes are configured to, with the at least one processor, cause the first device to perform the method according to the first aspect.

In a third aspect, there is provided a non-transitory computer readable medium. The non-transitory computer readable medium comprises program instructions for causing an apparatus to perform the method according to the first aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

Figure 1:
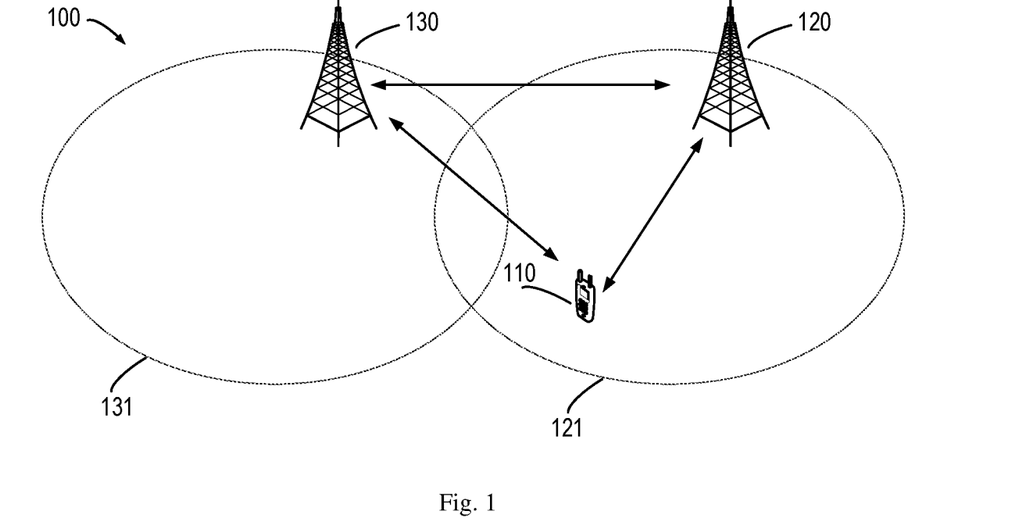
FIG. 1 illustrates an example communication network in which example embodiments of the present disclosure may be implemented.

FIG. 1 illustrates an example communication network 100 in which embodiments of the present disclosure can be implemented. As shown in FIG. 1, the network 100 includes a first device 110, a second device 120 and a third device 130. In some embodiments, the first device 110 may be a terminal device, the second device 120 may be a network device serving the first device 110, and the third device 130 may be a network device neighboring the second device 120. The second device 120 provides a serving cell 121 for the first device 110, and the third device 130 provides a neighbor cell 131 for the first device 110. It is to be understood that the number and type of first, second and third devices as shown in FIG. 1 are only for the purpose of illustration without suggesting any limitations. The network 100 may include any suitable number and type of first, second and third devices adapted for implementing embodiments of the present disclosure.

As shown in FIG. 1, the first, second and third devices 110, 120 and 130 may communicate with each other. For example, the second devices 120 and 130 may transmit downlink reference signals on predetermined resources, and the first device 110 may receive the downlink reference signals based on configuration information about the predetermined resources. Further, the first device 110 may measure the downlink reference signals and transmit the measurement results to the second device 120. In some embodiments, the downlink reference signals may be CSI-RS. It should be noted that other forms of downlink reference signals are also feasible.

The communications in the network 100 may conform to any suitable standards including, but not limited to, LTE, LTE-evolution, LTE-advanced (LTE-A), wideband code division multiple access (WCDMA), code division multiple access (CDMA) and global system for mobile communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

For downlink reference signal-based RRM measurements, the first device 110 may be configured to measure the downlink reference signals (also referred to as first downlink reference signals hereinafter) from the second device 120 and the downlink reference signals (also referred to as second downlink reference signals hereinafter) from third device 130 respectively. As the downlink reference signal resources in the neighbor cell 121 may have different bandwidth, different center frequency and/or different time-frequency location from that in the serving cell 131, the focus is on how to perform the measurements for the serving and neighbor cells for facilitating mobility decision.

Figure 2:
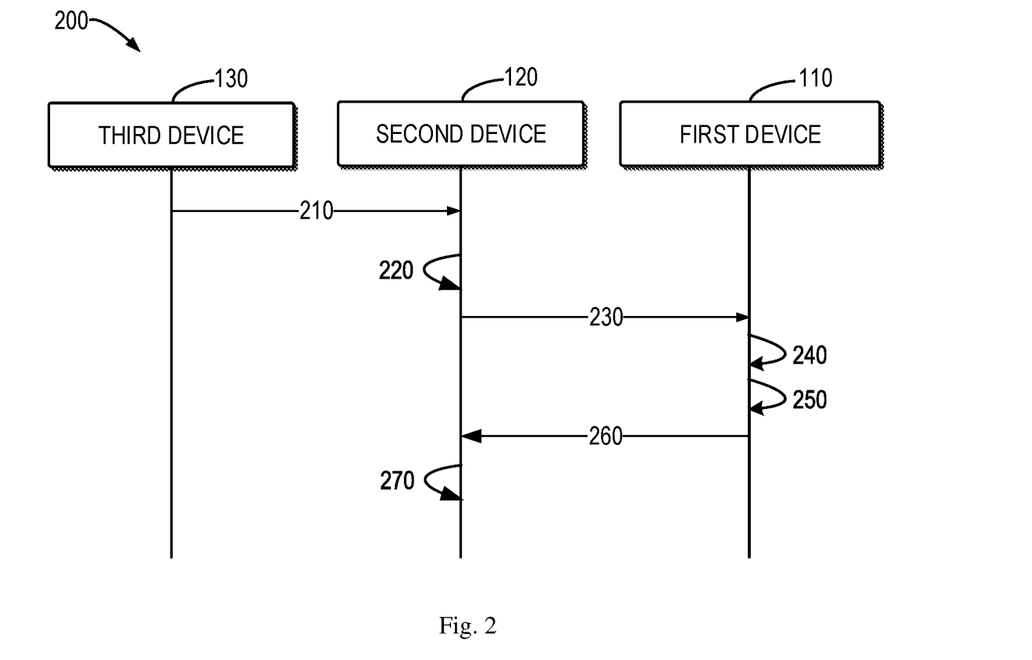
FIG. 2 illustrates a flowchart illustrating a process of communication during RRM measurements according to some embodiments of the present disclosure.

In view of this, embodiments of the present disclosure provide a solution of downlink reference signal-based RRM measurements, the mechanism of which is illustrated in a high-level flowchart as shown in FIG. 2.

FIG. 2 illustrates a flowchart 200 illustrating a process of communication during RRM measurements according to some embodiments of the present disclosure. As shown in FIG. 2, the third device 130 transmits 210, to the second device 120, a configuration (also referred to as a second configuration hereinafter) about its downlink reference signals for neighbor cell measurement, and correspondingly the second device 120 receives the second configuration.

The second device 120 may determine 220 a configuration (also referred to as a first configuration hereinafter) about a measurement (also referred to as a first measurement hereinafter) on its downlink reference signals (i.e., the first downlink reference signals), and transmit 230 the first and second configurations to the first device 110. In some embodiments, the first configuration may comprise a first bandwidth for the first measurement and a first density of the first downlink reference signal, and the second configuration may comprise a second bandwidth for the second measurement and a second density of the second downlink reference signal.

For example, the first and second configurations may be transmitted to the first device 110 via a CSI-RS-ResourceConfigMobility information element (IE). It should be noted that the first and second configurations may also be transmitted to the first device 110 in another suitable way. In some embodiments, each of the first and second bandwidths may be selected from a group comprising 24 physical resource blocks (PRBs), 48 PRBs, 96 PRBs, 192 PRBs and 264 PRBs. In some embodiments, each of the first and second densities may be selected from a group comprising d1 and d3. d1 means that there is one downlink reference signal in a RE on one port of one PRB, and d3 means that there are three downlink reference signals in a RE on one port of one PRB.

Upon receiving the first and second configurations, the first device 110 may determine 240, based on an active bandwidth part (BWP) of the first device 110 and the first and second configurations, first information for the first measurement and second information for the second measurement. Here, the first information can be considered as a measurement condition for the first measurement and the second information can be considered as a measurement condition for the second measurements.

In some embodiments, the first device 110 may determine the first and second information so that a first result of the first measurement and a second result of the second measurement are at the same level in a measurement accuracy. In this way, the first and second results can be comparable in measurement accuracy and can facilitate to make a correct mobility decision such as a handover decision.

In some embodiments, the first information may comprise at least one of a first measurement bandwidth and a first measurement period for the first measurement, and the second information may comprise at least one of a second measurement bandwidth and a second measurement period for the second measurement. By balancing between measurement bandwidths and measurement periods for the first and second measurements, the measurement accuracy of a first result for the first measurement can be caused to be at the same order as the measurement accuracy of the second result for the second measurement.

In some embodiments, the first device 110 may be required to perform measurements within its active BWP, i.e., intra-frequency measurements. For example, the first device 110 may determine a portion (also referred to as a first portion below) of the first bandwidth within the active BWP and a portion (also referred to as a second portion below) of the second bandwidth within the active BWP, and determine the first and second information based on the first and second portions and the first and second density. It should be noted that the present disclosure is not limited to the intra-frequency measurements, and measurements beyond its active BWP, i.e., inter-frequency measurements may also be adopted.

Upon determining the first and second information, the first device 110 may determine 250 the first and second results by performing the first measurement based on the first information and performing the second measurement based on the second information, and transmit 260 the first and second results to the second device 120. Upon receiving the first and second results, the second device 120 makes 270 a mobility decision for RRM based on the first and second results.

Corresponding to the above process, some example embodiments of the present disclosure will now be described in detail with reference to the figures. However, those skilled in the art would readily appreciate that the detailed description given herein with respect to these figures is for explanatory purpose as the present disclosure extends beyond theses limited embodiments.

Figure 3:
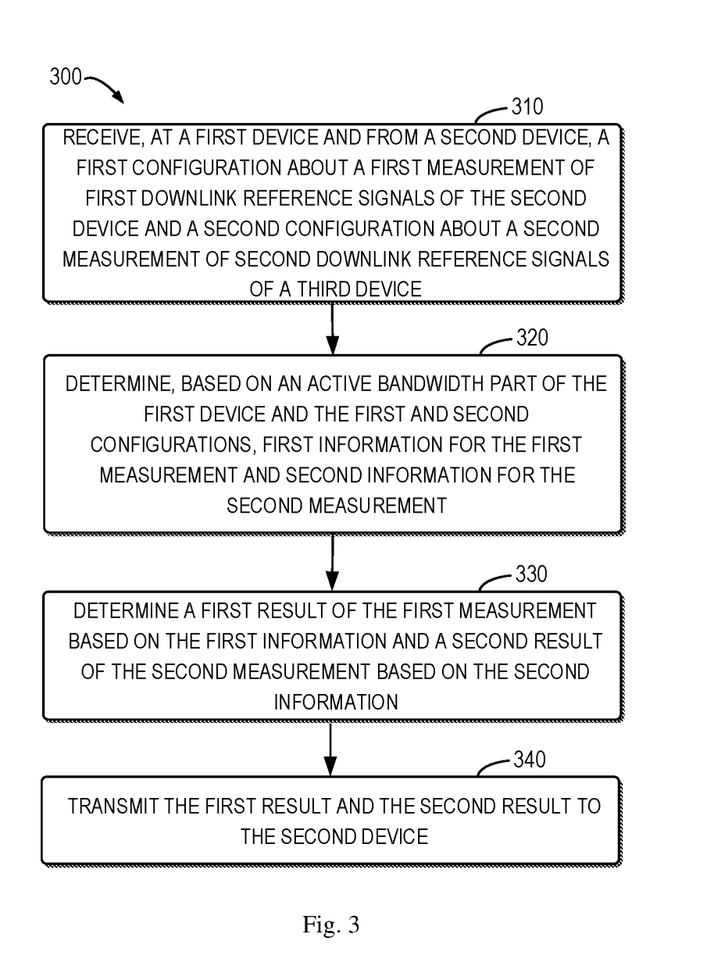
FIG. 3 illustrates a flowchart of a method of communication implemented at a first device according to example embodiments of the present disclosure.

FIG. 3 illustrates a flowchart of a method 300 of communication implemented at a first device according to example embodiments of the present disclosure. The method 300 can be implemented at the first device 110 shown in FIG. 1. For the purpose of discussion, the method 300 will be described with reference to FIG. 1. It is to be understood that method 300 may further include additional blocks not shown and/or omit some shown blocks, and the scope of the present disclosure is not limited in this regard.

As shown in FIG. 3, at block 310, the first device 110 receives, from the second device 120, a first configuration about a first measurement of first downlink reference signals of the second device 120 and a second configuration about a second measurement of second downlink reference signals of the third device 130. In some embodiments, the first device 110 may receive the first and second configurations via a predefined IE, for example, the CSI-RS-ResourceConfigMobility IE or any other suitable IEs.

In some embodiments, the first configuration may comprise a first bandwidth for the first measurement and a first density of the first downlink reference, and the second configuration may comprise a second bandwidth for the second measurement and a second density of the second downlink reference signal. For example, each of the first and second bandwidths may be selected from a group comprising 24 PRBs, 48 PRBs, 96 PRBs, 192 PRBs and 264 PRBs, and each of the first and second densities may be selected from a group comprising d1 and d3.

At block 320, the first device 110 determines, based on an active BWP of the first device 110 and the first and second configurations, first information for the first measurement and second information for the second measurement. In some embodiments, the first device 110 may determine the first and second information so that the first and second results are at the same level in a measurement accuracy.

In some embodiments, the first information may comprise at least one of a first measurement bandwidth and a first measurement period for the first measurement, and the second information may comprise at least one of a second measurement bandwidth and a second measurement period for the second measurement.

According to embodiments of the present disclosure, by balancing the measurement bandwidths and measurement periods for the first and second measurements, the measurement accuracy of the first downlink reference signals for the first measurement can be caused to be at the same level as the measurement accuracy of the second downlink reference signals for the second measurement, and thus the first and second results can be caused to be comparable in a measurement accuracy.

Figure 4:
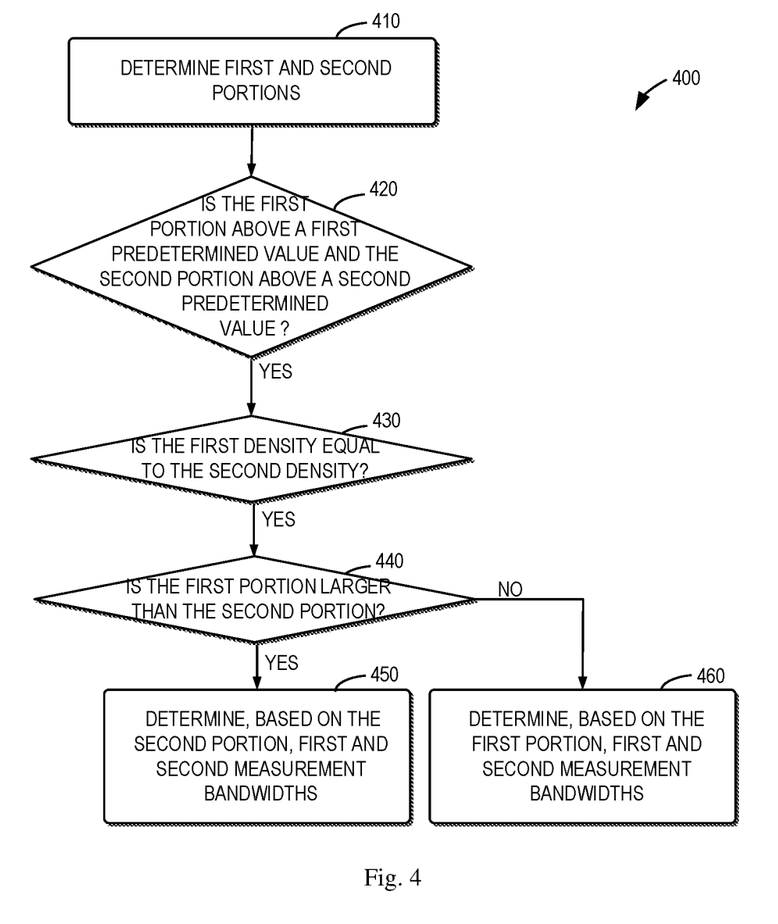
FIG. 4 illustrates a flowchart of an example method of determining first and second information for first and second measurements according to example embodiments of the present disclosure.

More details about determination of the first and second information will be described below in connection with FIGS. 4-8. FIG. 4 illustrates a flowchart of an example method 400 of determining the first and second information according to example embodiments of the present disclosure. The method 400 can be implemented at the first device 110 shown in FIG. 1. For the purpose of discussion, the method 400 will be described with reference to FIG. 1. It is to be understood that method 400 may further include additional blocks not shown and/or omit some blocks shown, and the scope of the present disclosure is not limited in this regard.

Figure 5:
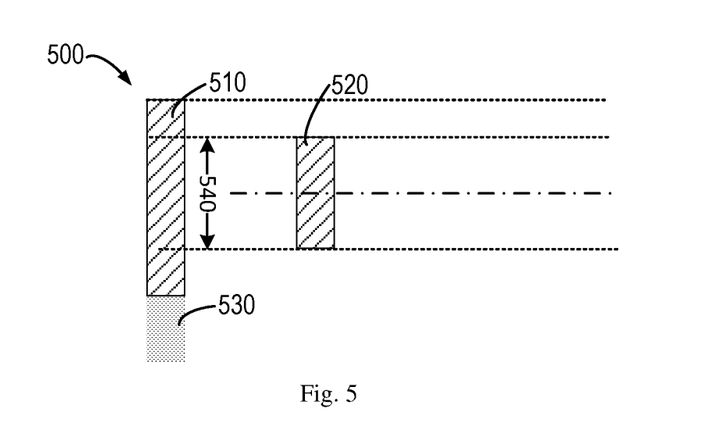
FIG. 5 illustrates a diagram showing an example determination of the first and second information according to example embodiments of the present disclosure.

At block 410, the first device 110 may determine a first portion (also referred to as BW1 below) of the first bandwidth within the active BWP and a second portion (also referred to as BW2 below) of the second bandwidth within the active BWP. In this embodiment, an intra-frequency measurement is considered. FIG. 5 illustrates a diagram 500 showing an example determination of the first and second information according to example embodiments of the present disclosure.

As shown in FIG. 5, reference sign 510 represents the first bandwidth in the first configuration from the serving cell 121, reference sign 520 represents the second bandwidth in the second configuration from the neighbor cell 131, and reference sign 530 represents the active BWP of the first device 110. Here, a part of the active BWP 530 is blocked by the first bandwidth 510 in the figure. It can be seen that the first bandwidth 510 and the second bandwidth 520 are both within the active BWP 530. In this case, the first device 110 may determine the first bandwidth 510 and the second bandwidth 520 as BW1 and BW2 respectively. For example, in some embodiments in which the active BWP 530 is 100 PRBs, the first bandwidth 510 is 96 PRBs and the second bandwidth 520 is 48 PRBs, BW1 may be 96 PRBs and BW2 may be 48 PRBs.

At block 420, the first device 110 may determine whether the first portion is above a first predetermined value and the second portion is above a second predetermined value. In some embodiments, the first predetermined value may be associated with the first density, and the second predetermined value may be associated with the second density. That is, a threshold may be set for a measurement bandwidth and may be set in association with a density of downlink reference signals. To some extent, the threshold may be considered as a minimum measurement bandwidth.

If it is determined at block 420 that the first portion is below the first predetermined value or the second portion is below the second predetermined value, the first device 110 may determine the first and second information based on a predetermined measurement condition. The predetermined measurement condition may comprise at least one of a measurement bandwidth and a measurement period under an accuracy requirement (also referred to as a minimum accuracy requirement herein). In some embodiments, the first device 110 may be not expected to measure the downlink reference signal resource, i.e., no accuracy requirement. In some embodiments, new accuracy requirements may be defined for the measurement bandwidth below the threshold.

If it is determined at block 420 that the first portion is above the first predetermined value and the second portion is above the second predetermined value, the first device 110 may determine the first and second information based on an active bandwidth part of the first device and the first and second configuration. In some embodiments, at block 430, the first device 110 may determine whether the first density is equal to the second density.

If it is determined at block 430 that the first density is equal to the second density, the first device 110 may determine the smaller one of the first portion and the second portion, and determine the first and second measurement bandwidths. In some embodiments, at block 440, the first device 110 may determine whether the first portion is larger than the second portion. If it is determined at block 440 that the first portion is larger than the second portion, the first device 110 at block 450 may determine the first and second measurement bandwidths based on the second portion. If it is determined at block 440 that the first portion is smaller than or equal to the second portion, the first device 110 at block 460 may determine the first and second measurement bandwidths based on the first portion.

With reference to FIG. 5, in one example, the first density configured together with the first bandwidth 510 may be d3, the second density configured together with the second bandwidth 520 may also be d3, BW1 may be 96 PRBs, and BW2 may be 48 PRBs, as described above. In this example, if the accuracy requirement is defined for 48 PRBs and d3, the first device 110 may determine 48 PRBs as the first and second measurement bandwidths. As shown by reference sign 540 in FIG. 5, only a part of the first bandwidth is measured in the serving cell 121 without measuring the whole of the first bandwidth. The whole of the second bandwidth is measured in the neighbor cell 131.

Figure 6:
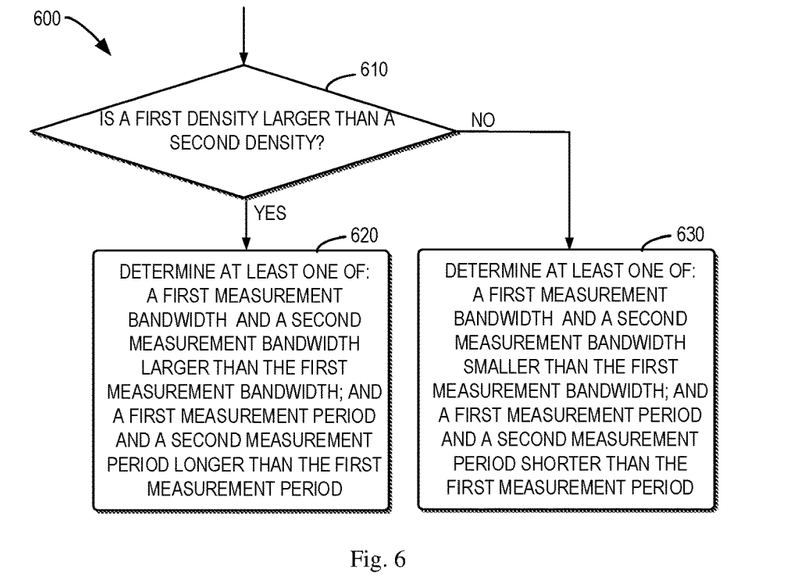
FIG. 6 illustrates a flowchart of another example method of determining the first and second information according to example embodiments of the present disclosure.

The above description is made on the embodiments in the case that the first density is equal to the second density. The following description in connection with FIGS. 6-8 will be made on the embodiments in the case that the first density is not equal to the second density. FIG. 6 illustrates a flowchart of another example method 600 of determining the first and second information according to example embodiments of the present disclosure. The method 600 can be implemented at the first device 110 shown in FIG. 1. For the purpose of discussion, the method 600 will be described with reference to FIG. 1. It is to be understood that method 600 may further include additional blocks not shown and/or omit some blocks shown, and the scope of the present disclosure is not limited in this regard.

At block 610, the first device 110 may determine whether a first density is larger than a second density. If it is determined at block 610 that the first density is larger than the second density, the process proceeds in block 620. At block 620, the first device 110 may determine at least one of: a first measurement bandwidth in the first information and a second measurement bandwidth larger than the first measurement bandwidth in the second information; and a first measurement period in the first information and a second measurement period longer than the first measurement period in the second information. In this way, the measurement accuracy of the downlink reference signals for measurements in the serving cell 121 and neighbor cell 131 can be substantially at the same level. For illustration, some examples will be described below in connection with FIG. 7.

Figure 7:
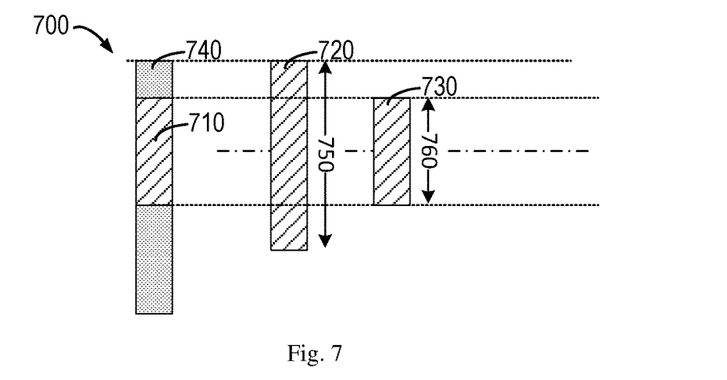
FIG. 7 illustrates a diagram showing another example determination of the first and second information according to example embodiments of the present disclosure.

FIG. 7 illustrates a diagram 700 showing another example determination of the first and second information according to example embodiments of the present disclosure. As shown in FIG. 7, reference sign 710 represents the first bandwidth in the first configuration from the serving cell 121, reference signs 720 and 730 represent two examples of the second bandwidth in the second configuration from the neighbor cell 131, and reference sign 740 represents the active BWP of the first device 110. In some examples, the first bandwidth 710 may be 48 PRBs, the first density may be d3, and the active BWP may be 100 PRBs.

In an example in which the second bandwidth is 96 PRBs (as shown by 720) and the second density is d1, the first device 110 may use a wider measurement bandwidth for neighbor cell 131 than that for serving cell 121. For example, the first device 110 may determine 48 PRBs as the first measurement bandwidth, and determine 96 PRBs as the second measurement bandwidth as shown by 750.

In another example in which the second bandwidth is 48 PRBs (as shown by 730) and the second density is d1, the first device 110 may use the same measurement bandwidth for neighbor cell 131 and serving cell 121, but with a longer measurement period. For example, the first device 110 may determine 48 PRBs as the first and second measurement bandwidths as shown by 760, and determine the second measurement period so that a comparable number of samples (for example, 10 samples) can be used. In this case, the second measurement period is longer than the first measurement period. In some alternative embodiments, the measurement period may be not changed, and the measurement accuracy requirement may be redefined based on 48 PRBs and d1.

Returning to FIG. 6, if it is determined at block 610 that the first density is smaller than the second density, the process proceeds in block 630. At block 630, the first device 110 may determine at least one of: a first measurement bandwidth in the first information and a second measurement bandwidth smaller than the first measurement bandwidth in the second information; and a first measurement period in the first information and a second measurement period shorter than the first measurement period in the second information. For illustration, some examples will be described below in connection with FIG. 8.

Figure 8:
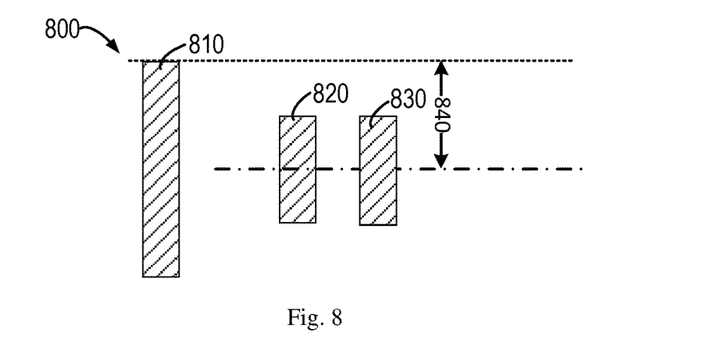
FIG. 8 illustrates a diagram showing another example determination of the first and second information according to example embodiments of the present disclosure.

FIG. 8 illustrates a diagram 800 showing another example determination of the first and second information according to example embodiments of the present disclosure. As shown in FIG. 8, reference sign 810 represents the first configuration from the serving cell 121, and reference signs 820 and 830 represent two examples of the second configuration from the neighbor cell 131. In some examples, the first bandwidth in the first configuration 810 may be 96 PRBs and the first density may be d1.

In an example in which the second bandwidth is 48 PRBs and the second density is d1 (as shown by 820), the first device 110 may use a narrower measurement bandwidth for neighbor cell 131 than that for serving cell 121 but a longer measurement period. For example, the first device 110 may determine 96 PRBs as the first measurement bandwidth, determine 48 PRBs as the second measurement bandwidth, and determine the second measurement period so that comparable number of samples (for example, 10 samples) can be used. In this case, the second measurement period is longer than the first measurement period.

Alternatively, the first device 110 may determine a part of the first bandwidth as the first measurement bandwidth, as shown by 840. For example, the first device 110 may determine 48 PRBs as the first and second measurement bandwidths. In this case, the first and second measurement bandwidths are the same, and as the first and second density is same, the first and second measurement periods are also the same.

In another example in which the second bandwidth is 48 PRBs and the second density is d3 (as shown by 830), the first device 110 may use a narrower measurement bandwidth for neighbor cell 131 than that for serving cell 121. For example, the first device 110 may determine 96 PRBs as the first measurement bandwidth and determine 48 PRBs as the second measurement bandwidths. In this case, as the first density is d1 and the second density is d3, the number of samples for the first and second measurements are substantially at the same order. In some alternative embodiments, the measurement accuracy requirement may be redefined based on 48 PRBs and d1, and the first and second measurements are performed based on the requirement.

So far, the determination of the first and second information is described. Now returning to FIG. 3, upon determining the first and second information, the first device 110 at block 330 determines a first result of the first measurement based on the first information and a second result of the second measurement based on the second information. The determination of the first and second results may be carried out by performing the first and second measurements in other suitable ways and are not limited by the present disclosure.

At block 340, the first device 110 may transmit the first and second results to the second device 120. As the first and second results are comparable in measurement accuracy, a fair comparison between the first and second results can be made for mobility decision, and thus a correct mobility decision such as a handover decision can be made.

Further, embodiments of the present disclosure give flexibility to network configuration dependent on the system capacity while ensuring measurement results are comparable. In addition, embodiments of the present disclosure help to ensure better measurement performance despite having different configurations for the first and second measurements, and thereby enables more effective adjustments to the network configurations.

In some embodiments, an apparatus (for example, the first device 110) capable of performing the method 300 may comprise means for performing the respective steps of the method 300. The means may be implemented in any suitable form. For example, the means may be implemented in a circuitry or software module.

In some embodiments, the apparatus may comprise: means for receiving, at a first device and from a second device, a first configuration about a first measurement of first downlink reference signals of the second device and a second configuration about a second measurement of second downlink reference signals of a third device; means for determining, based on an active bandwidth part of the first device and the first and second configurations, first information for the first measurement and second information for the second measurement; means for determining a first result of the first measurement based on the first information and a second result of the second measurement based on the second information; and means for transmitting the first result and the second result to the second device.

In some embodiments, the means for determining the first and second information may comprise: means for determining the first and second information so that the first result and the second result are at the same level in a measurement accuracy.

In some embodiments, the first information comprises at least one of a first measurement bandwidth and a first measurement period for the first measurement, and the second information comprises at least one of a second measurement bandwidth and a second measurement period for the second measurement.

In some embodiments, the first configuration may comprise a first bandwidth for the first measurement and a first density of the first downlink reference signal on a resource element, and the second configuration may comprise a second bandwidth for the second measurement and a second density of the second downlink reference signal on a resource element.

In some embodiments, the means for determining the first and second information may comprise: means for determining a first portion of the first bandwidth within the active bandwidth part and a second portion of the second bandwidth within the active bandwidth part; and means for determining, in accordance with a determination that the first portion is above a first predetermined value and the second portion is above a second predetermined value, the first and second information based on an active bandwidth part of the first device and the first and second configuration. In some embodiments, the first predetermined value is associated with the first density, and the second predetermined value is associated with the second density.

In some embodiments, the means for determining the first and second information may comprise: means for determining, in accordance with a determination that the first and second densities are identical, the smaller one of a first portion of the first bandwidth within the active bandwidth part and a second portion of the second bandwidth within the active bandwidth part; and means for determining, based on the smaller one, a first measurement bandwidth in the first information and a second measurement bandwidth in the second information.

In some embodiments, the means for determining the first and second information may comprise: means for determining, in accordance with a determination that the first density is higher than the second density, at least one of: a first measurement bandwidth in the first information and a second measurement bandwidth larger than the first measurement bandwidth in the second information; and a first measurement period in the first information and a second measurement period longer than the first measurement period in the second information.

In some embodiments, the means for determining the first and second information may comprise: means for determining, in accordance with a determination that the first density is lower than the second density, at least one of: a first measurement bandwidth in the first information and a second measurement bandwidth smaller than the first measurement bandwidth in the second information; and a first measurement period in the first information and a second measurement period shorter than the first measurement period in the second information.

In some embodiments, the first device may be a terminal device, the second device may be a network device serving the terminal device, and the third device may be a network device neighboring the second device.

Figure 9:
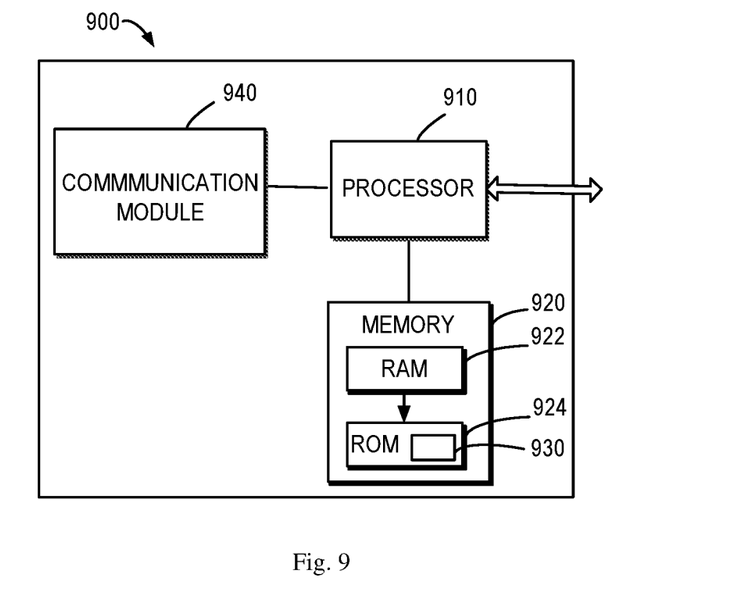
FIG. 9 illustrates a simplified block diagram of an apparatus that is suitable for implementing example embodiments of the present disclosure.

FIG. 9 is a simplified block diagram of a device 900 that is suitable for implementing embodiments of the present disclosure. The device 900 may be provided to implement the first device, for example the first device 110 as shown in FIG. 1. As shown, the device 900 includes one or more processors 910, one or more memories 920 coupled to the processor 910, and one or more communication modules 940 (such as, transmitters and/or receivers) coupled to the processor 910.

The communication module 940 is for bidirectional communications. The communication module 940 has at least one antenna to facilitate communication. The communication interface may represent any interface that is necessary for communication with other network elements.

The processor 910 may be of any type suitable to the local technical network and may include one or more of the following: general purpose computers, special purpose computers, microprocessors, digital signal processors (DSPs) and processors based on multicore processor architecture, as non-limiting examples. The device 900 may have multiple processors, such as an application specific integrated circuit chip that is slaved in time to a clock which synchronizes the main processor.

The memory 920 may include one or more non-volatile memories and one or more volatile memories. Examples of the non-volatile memories include, but are not limited to, a Read Only Memory (ROM) 924, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 922 and other volatile memories that will not last in the power-down duration.

A computer program 930 includes computer executable instructions that are executed by the associated processor 910. The program 930 may be stored in the ROM 924. The processor 910 may perform any suitable actions and processing by loading the program 930 into the RAM 922.

The embodiments of the present disclosure may be implemented by means of the program 930 so that the device 900 may perform any process of the disclosure as discussed with reference to FIGS. 2-4 and 6. The embodiments of the present disclosure may also be implemented by hardware or by a combination of software and hardware.

Figure 10:
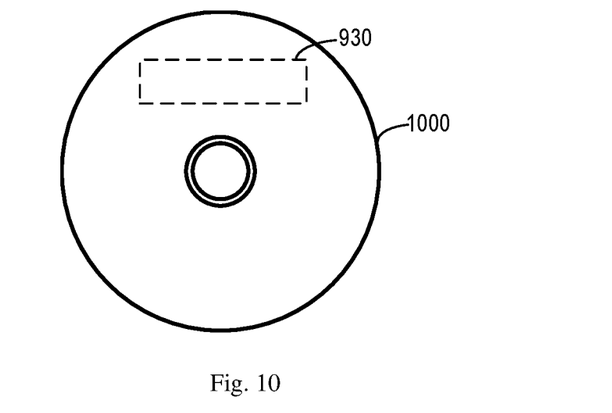
FIG. 10 illustrates a block diagram of an example computer readable medium in accordance with example embodiments of the present disclosure.

In some embodiments, the program 930 may be tangibly contained in a computer readable medium which may be included in the device 900 (such as in the memory 920) or other storage devices that are accessible by the device 900. The device 900 may load the program 930 from the computer readable medium to the RAM 922 for execution. The computer readable medium may include any types of tangible non-volatile storage, such as ROM, EPROM, a flash memory, a hard disk, CD, DVD, and the like. FIG. 10 shows an example of the computer readable medium 1000 in form of CD or DVD. The computer readable medium has the program 930 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 300, 400 and 600 as described above with reference to FIGS. 3, 4 and 6. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method, comprising:
   receiving, at a first device and from a second device, a first configuration about a first measurement of first downlink reference signals of the second device and a second configuration about a second measurement of second downlink reference signals of a third device;
   determining, based on an active bandwidth part of the first device and the first and second configurations, first information for the first measurement and second information for the second measurement;
   determining a first result of the first measurement based on the first information and a second result of the second measurement based on the second information, wherein determining the first information for the first measurement and the second information for the second measurement comprises determining the first information and the second information so that the first result and the second result are at a same level in a measurement accuracy; and
   transmitting the first result and the second result to the second device.

2. The method of claim 1, wherein the first information comprises at least one of a first measurement bandwidth and a first measurement period for the first measurement, and the second information comprises at least one of a second measurement bandwidth and a second measurement period for the second measurement.

3. The method of claim 1, wherein the first configuration comprises a first bandwidth for the first measurement and a first density of the first downlink reference signal, and wherein the second configuration comprises a second bandwidth for the second measurement and a second density of the second downlink reference signal.

4. The method of claim 3, wherein determining the first and second information comprises:
   determining a first portion of the first bandwidth within the active bandwidth part and a second portion of the second bandwidth within the active bandwidth part; and
   in accordance with a determination that the first portion is above a first predetermined value and the second portion is above a second predetermined value, determining the first and second information based on an active bandwidth part of the first device and the first and second configuration.

5. The method of claim 4, wherein the first predetermined value is associated with the first density, and the second predetermined value is associated with the second density.

6. The method of claim 3, wherein determining the first and second information comprises:
   in accordance with a determination that the first and second densities are identical,
   determining the smaller one of a first portion of the first bandwidth within the active bandwidth part and a second portion of the second bandwidth within the active bandwidth part; and
   determining, based on the smaller one, a first measurement bandwidth in the first information and a second measurement bandwidth in the second information.

7. The method of claim 3, wherein determining the first and second information comprises:
   in accordance with a determination that the first density is higher than the second density, determining at least one of:
   a first measurement bandwidth in the first information and a second measurement bandwidth larger than the first measurement bandwidth in the second information; and
   a first measurement period in the first information and a second measurement period longer than the first measurement period in the second information.

8. The method of claim 3, wherein determining the first and second information comprises:
   in accordance with a determination that the first density is lower than the second density, determining at least one of:
   a first measurement bandwidth in the first information and a second measurement bandwidth smaller than the first measurement bandwidth in the second information; and
   a first measurement period in the first information and a second measurement period shorter than the first measurement period in the second information.

9. The method of claim 1, wherein the first device is a terminal device, the second device is a network device serving the terminal device, and the third device is a network device neighboring the second device.

10. A first device, comprising:
    at least one processor; and
    at least one memory including computer program codes;
    the at least one memory and the computer program codes are configured to, with the at least one processor, cause the first device to:
    receive, from a second device, a first configuration about a first measurement of first downlink reference signals of the second device and a second configuration about a second measurement of second downlink reference signals of a third device;
    determine, based on an active bandwidth part of the first device and the first and second configurations, first information for the first measurement and second information for the second measurement, wherein determining the first information for the first measurement and the second information for the second measurement comprises determining the first information and the second information so that the first result and the second result are at a same level in a measurement accuracy;
    determine a first result of the first measurement based on the first information and a second result of the second measurement based on the second information; and
    transmit the first result and the second result to the second device.

11. The first device of claim 10, wherein the first information comprises at least one of a first measurement bandwidth and a first measurement period for the first measurement, and the second information comprises at least one of a second measurement bandwidth and a second measurement period for the second measurement.

12. The first device of claim 10, wherein the first configuration comprises a first bandwidth for the first measurement and a first density of the first downlink reference signal, and
    wherein the second configuration comprises a second bandwidth for the second measurement and a second density of the second downlink reference signal.

13. The first device of claim 12, wherein the first device is caused to determine the first and second information by:
    determining a first portion of the first bandwidth within the active bandwidth part and a second portion of the second bandwidth within the active bandwidth part; and
    in accordance with a determination that the first portion is above a first predetermined value and the second portion is above a second predetermined value, determining the first and second information based on an active bandwidth part of the first device and the first and second configuration.

14. The first device of claim 13, wherein the first predetermined value is associated with the first density, and the second predetermined value is associated with the second density.

15. The first device of claim 12, wherein the first device is caused to determine the first and second information by:
    in accordance with a determination that the first and second densities are identical,
    determining the smaller one of a first portion of the first bandwidth within the active bandwidth part and a second portion of the second bandwidth within the active bandwidth part; and
    determining, based on the smaller one, a first measurement bandwidth in the first information and a second measurement bandwidth in the second information.

16. The first device of claim 12, wherein the first device is caused to determine the first and second information by:
    in accordance with a determination that the first density is higher than the second density, determining at least one of:
    a first measurement bandwidth in the first information and a second measurement bandwidth larger than the first measurement bandwidth in the second information; and
    a first measurement period in the first information and a second measurement period longer than the first measurement period in the second information.

17. The first device of claim 12, wherein the first device is caused to determine the first and second information by:
in accordance with a determination that the first density is lower than the second density, determining at least one of:
a first measurement bandwidth in the first information and a second measurement bandwidth smaller than the first measurement bandwidth in the second information; and
a first measurement period in the first information and a second measurement period shorter than the first measurement period in the second information.

18. The first device of claim 10, wherein the first device is a terminal device, the second device is a network device serving the terminal device, and the third device is a network device neighboring the second device.

19. A system comprising:
a first device;
at least one processor; and
at least one memory including computer program codes;
the at least one memory and the computer program codes are configured to, with the at least one processor, cause the first device to:
receive, from a second device, a first configuration about a first measurement of first downlink reference signals of the second device and a second configuration about a second measurement of second downlink reference signals of a third device;
determine, based on an active bandwidth part of the first device and the first and second configurations, first information for the first measurement and second information for the second measurement, wherein determining the first information for the first measurement and the second information for the second measurement comprises determining the first information and the second information so that the first result and the second result are at a same level in a measurement accuracy;
determine a first result of the first measurement based on the first information and a second result of the second measurement based on the second information; and
transmit the first result and the second result to the second device.

* * * * *